UNITED STATES PATENT OFFICE.

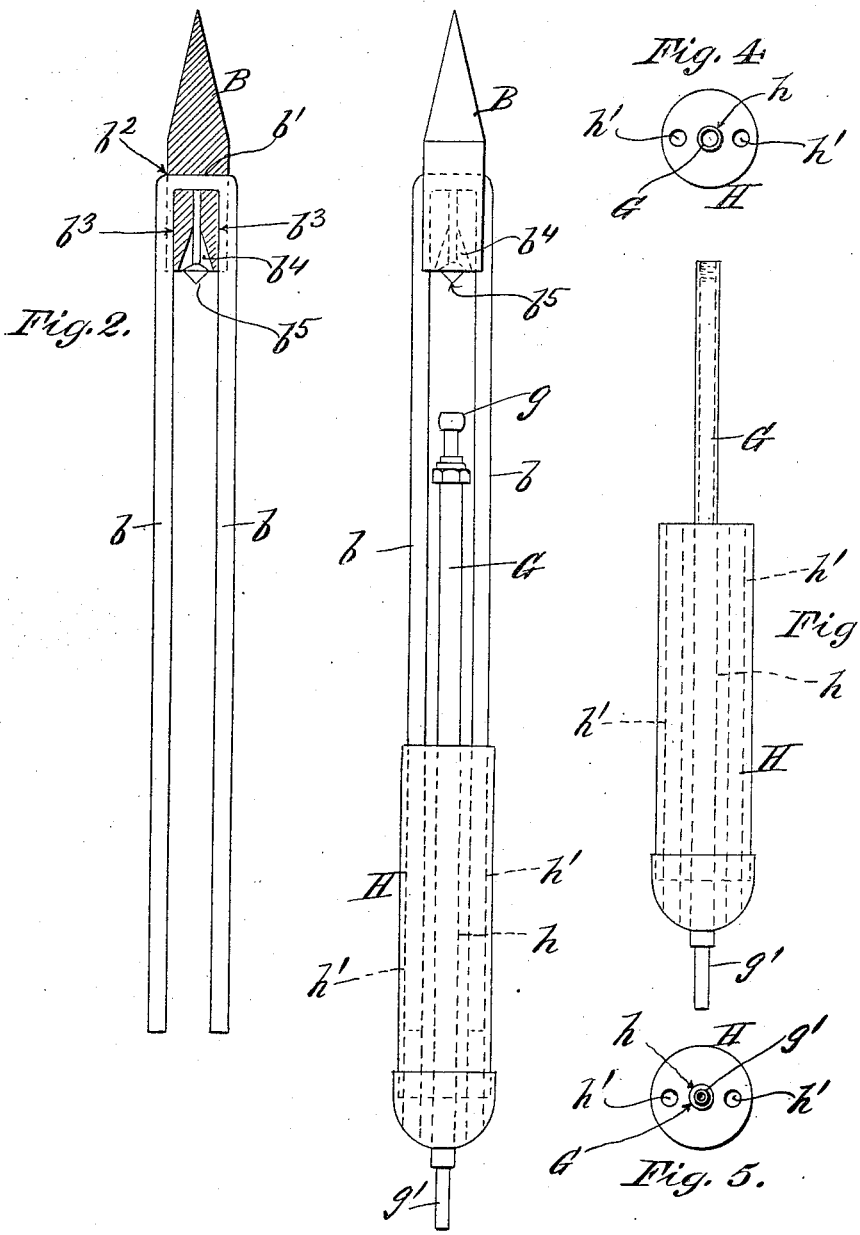

NAPOLEON MARTEL AND JOSEPH ERVIN RASCOE, OF PLATTSBURG, NEW YORK, ASSIGNORS OF ONE-THIRD TO SOLOMON S. KEMPNER, OF PLATTSBURG, NEW YORK.

SELF-HEATING SOLDERING-IRON.

1,230,915.

Specification of Letters Patent.    Patented June 26, 1917.

Application filed July 3, 1916.   Serial No. 107,463.

*To all whom it may concern:*

Be it known that we, NAPOLEON MARTEL, a citizen of the United States, residing in the city of Plattsburg, in the county of Clinton and State of New York, and JOSEPH ERVIN RASCOE, a citizen of the United States, residing in the city of Plattsburg, in the county of Clinton and State of New York, have invented certain new and useful Improvements in Self-Heating Soldering-Irons, of which the following is a specification.

The object of our invention is the production of a simple, cheap, but effective self-heating soldering iron of the class in which gas under pressure is used as the heating medium; and the invention consists in the construction and arrangement of parts herein described and claimed specifically, distinctive features relating to the formation of the copper bit or head, and to the means for supporting the same in adjustable relation to the gas nozzle, all as hereinafter fully set forth.

In the accompanying drawings,

Figure 1, is a side elevation of our improved self-heating soldering implement;

Fig. 2, is a sectional elevation of the copper head or bit, showing its shank rods in elevation;

Fig. 3, is a side elevation of the handle member and gas tubes;

Fig. 4, is an elevation of the front end of the handle member;

Fig. 5, is a rear elevation thereof.

The handle H, is formed with a central longitudinal socket $h$, in which the gas tube G, is rigidly mounted; the forward end of the latter being provided with a nozzle $g$, (Fig. 1,) of any desired or well known construction. $g'$, is a nipple protruding from the gas tube G, at the rear end of the handle H, for connection with a flexible tube communicating with a supply of gas under pressure. The handle H, is also formed with two parallel longitudinal sockets $h'$, $h'$, for the reception and support of the rear portions of the parallel shank rods $b$, $b$, of the copper head or bit B. These shank rods $b$, $b$, are permanently incorporated at their outer extremities in and with the copper head or bit B, and may be formed in one piece as shown in Figs. 1, and 2, the medial portion $b'$, being embedded laterally in the head B, by being passed through a transverse hole $b^2$, formed for the purpose in the head B, which is also formed with longitudinal side grooves $b^3$, $b^3$, in which the forward portions of the shank rods rest when bent parallel to each other, as shown more particularly in Fig. 2, thereby effectually coupling and combining the head and rods rigidly together.

This method of supporting the copper soldering "iron" or head B, is cheap and effective,—the shank rods $b$, $b$, being held in their sockets $h'$, $h'$, by close fit and frictional contact, so that the head B, may be quickly and conveniently adjusted in position with relation to the gas nozzle $g$, as may be found most expedient during the exigencies of use.

The rear end of the head or bit B, facing the gas nozzle $g$, is formed with a recess $b^4$, preferably of conoidal form, as shown in Fig. 2, constituting a heating chamber; and protruding axially from this recess $b^4$, is a pin, stud, or diffusing plug $b^5$, consisting of a mushroom-shaped plug the inner end of the shank of which is embedded in the head B, as also shown in said Fig. 2. In other words the diffusing plug $b^5$, is in axial alinement with the nozzle $g$, of the gas tube G, so that the jet of flame impinges against the conoidal head of the plug and is deflected thereby and into the recess. This construction of the butt or rear end of the head B, insures thorough and rapid diffusion of heat in an economical manner.

The head B, and its shank rods $b$, $b$, may be readily detached from the handle H, by simply withdrawing the rods therefrom when it is desired to use the gas tube G, and nozzle as a torch for any of the various uses to which torches of this character may be applied in the arts.

It is to be understood that the term "soldering iron" is used as descriptive of the class of implement to which our invention relates.

What we claim as our invention and desire to secure by Letters Patent is,

1. In a soldering implement of the character designated, the combination of a handle, a gas supply tube mounted therein, a member formed with parallel shank rods fitting longitudinal sockets formed for their reception in the handle and held therein by frictional contact solely and a head having a transverse opening in which the medial transverse portion of the shank rods is engaged, the butt end of said head being recessed to form a heating chamber, and an axially disposed protuberant diffusing plug and a gas tube extended through the handle and between the said shank rods in axial alinement with said plug.

2. In a soldering implement of the character designated, a soldering head having a transverse passage for the lateral portion of parallel shank rods and longitudinal side grooves for the reception of said rods, said head being formed at its butt end with a conoidal heating chamber, and an axially disposed protruding diffusion plug extended partially within and partially without said heating chamber.

3. In a soldering implement of the character designated, the combination of a handle, a gas supply tube mounted therein, and a soldering head or bit formed with parallel shank rods fitting longitudinal sockets formed for their reception in the handle and held therein by frictional contact, said shank rods being formed of a single piece the medial portion of which rests in a transverse hole formed for it in the head, the latter being also formed with longitudinal side grooves in which the forward portions of said shank rods rest, for the purpose described.

NAPOLEON MARTEL.
J. ERVIN X RASCOE.
his mark

Witness to mark:
G. H. ARCHAMBAULT.

Copies of this patent may be obtained for five cents each, by addressing the "Commissioner of Patents, Washington, D. C."